June 18, 1968  P. BAUSCH  3,388,762

REAR WHEEL SUSPENSIONS FOR MOTOR VEHICLES

Filed March 4, 1966

Inventor
Paul Bausch
BY
W. F. Wagner
Attorney

United States Patent Office 3,388,762
Patented June 18, 1968

3,388,762
REAR WHEEL SUSPENSIONS FOR MOTOR VEHICLES
Paul Bausch, Burggraben, Germany, assignor to General Motors Corporation, Detroit, Mich., a corporation of Delaware
Filed Mar. 4, 1966, Ser. No. 531,691
Claims priority, application Germany, Mar. 26, 1965, O 10,741
6 Claims. (Cl. 180—73)

ABSTRACT OF THE DISCLOSURE

A one-piece torsional roll stabilizer of the type including a torsionally active transverse portion rotatably connected to a vehicle axle and longitudinally extending free end portions pivotally connected to the vehicle chassis in which the torsionally active portion includes laterally spaced aligned portions and an arched central portion with the aligned portions connected to the vehicle axle by spaced bearings defining a common axis and the arched portion connected to the axle by a bearing spaced from the common axis so that axle wind-up in either direction is resisted by torsional deflection of the torsionally active portion.

This invention relates to rear wheel suspensions for motor vehicles.

According to the invention, a rear wheel suspension for a motor vehicle comprises a rigid rear axle assembly including an opposed pair of axle tubes rigidly connected to a differential housing, a pair of rear road wheels mounted for rotation at the outer ends of the axle tubes, suspension springs resiliently connecting the axle tubes to a sprung portion of the vehicle, and a one-piece torsion bar spring having a generally transversely extending body portion rotatably mounted on the axle tubes, longitudinally extending arm portions articulated at their free ends to the sprung portion of the vehicle, and, centrally of the body portion, an arch-like curved portion which is rotatably mounted on the differential housing.

The scope of the monopoly is defined by the appended claims; the invention and how it can be performed are hereinafter particularly described with reference to the accompanying drawings, in which:

Figure 1:
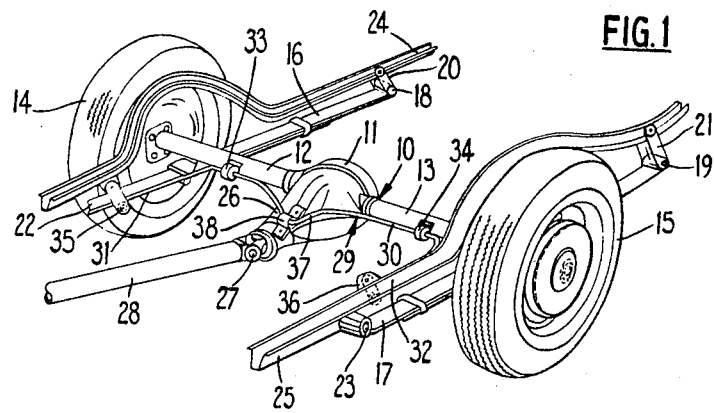
FIGURE 1 is a perspective of one embodiment of a motor vehicle rear wheel suspension according to the invention, including a driven rigid rear axle suspended by longitudinally extending semi-elliptic spring.

In the rear wheel suspension shown in FIGURE 1, a rigid rear axle assembly 10 comprises a centrally disposed differential housing 11 to which are rigidly connected right- and left-hand axle tubes 12 and 13. The differential housing 11 contains a conventional differential gear (not shown) for driving rear road wheels 14 and 15 through the intermediary of drive half-shafts (not shown) mounted within the respective axle tubes 12 and 13.

The rear axle assembly 10 is guided and sprung by longitudinally extending semi-elliptic springs 16 and 17 (leaf springs) disposed at either side of the vehicle. The axle tubes 12 and 13 are connected to the respective leaf springs approximately at the centre of the springs, and the end portions of the leaf springs are pivotally connected to longitudinal side members 24 and 25 positioned below an underbody forming part of a sprung portion of the vehicle, the pivotal connections at the rear end of the springs being through respective spring shackles 20 and 21 but at the front end of the springs being direct. The differential housing 11 has a forwardly directed extension 26 in which a conventional drive pinion (not shown) is mounted. A Cardan joint 27 at the rear end of a conventional propeller shaft 28 is connected to the drive pinion, to supply drive torque from the engine of the vehicle to the road wheels.

A one-piece torsion bar spring 29 comprises a main body portion 30 which extends generally transversely of the vehicle, in front of the rear axle, and two terminal arm portions 31 and 32 which extend forwardly, at right angles to the body portion, longitudinally of the vehicle. The body portion 30 of the torsion bar spring 29 is rotatably mounted on the rear axle tubes 12 and 13 by bearings 33 and 34 adjacent the outer ends of the body portion, and the forwardly extending arm portions 31 and 32 of the torsion bar spring are articulated at their free ends to the side members 24 and 25 by bearing shackles 35 and 36 at the forward ends of the arm portions.

In conformity with the invention, in the region of the differential housing 11, the body portion 30 of the torsion bar spring 29 is formed with a central arch-like forwardly extending curved portion 37 which extends forwardly from the remainder of the body portion and is rotatably mounted on the forward extension 26 of the differential housing 11 by a bearing 38.

During normal ride movements of the vehicle involving equal vertical movements of the two rear wheels, the torsion bar spring 29 is ineffective, since the body portion 30 of the spring moves as a whole with the rear axle assembly, this movement being permitted by the articulation of the arm portions 31 and 32 of the spring to the longitudinal side members by the bearing shackles 35 and 36. However, the torsion bar spring 29 can give a stabilizing effect when there is uneven deflection of the road wheels, or when the vehicle body has a tendency to roll, since under such conditions the torsion bar is stressed in torsion, and thereby produces a restoring force giving the desired stabilizing effect. Additionally, the curved portion 37 of the torsion bar spring, and the bearing 38, produce an advantageous effect during acceleration and braking, as will now be described with reference to FIGURES 2 and 3.

Figure 2:
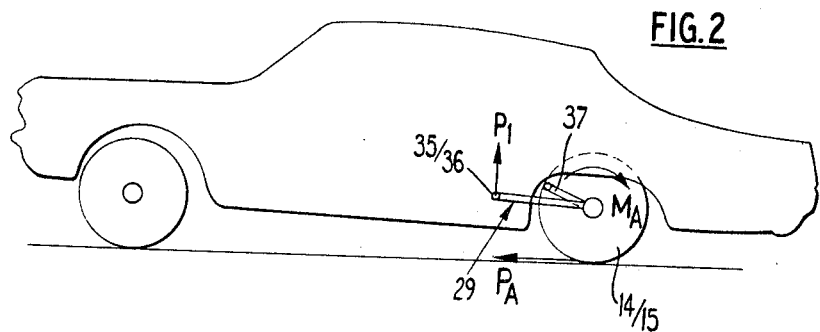
FIGURE 2 is a schematic side elevation of the motor vehicle, showing a torsion bar spring arrangement, forming part of the rear wheel suspension, in a position it assumes during acceleration of the vehicle.

As is indicated in FIGURE 2, when the vehicle accelerates it is acted upon, in the plane of the contact surface of each of the rear wheels 14 and 15, by a reaction force $P_A$ which tends to turn the rear axle assembly in the direction of the arrow $M_A$, and thus in the opposite sense to the direction of rotation of the road wheels. The resulting upward movement of the forward extension 26 of the differential housing 11 causes corresponding upward movement of the curved portion 37 of the torsion bar spring 29, so stressing the spring 29 in torsion and, by way of the forwardly extending arm portions 31 and 32 of the spring, and the bearing shackles 35 and 36, giving rise to an upwardly directed force $P_1$ at the longitudinal side members of the vehicle, thus opposing the tendency for the rear end of the vehicle to drop during acceleration.

Figure 3:
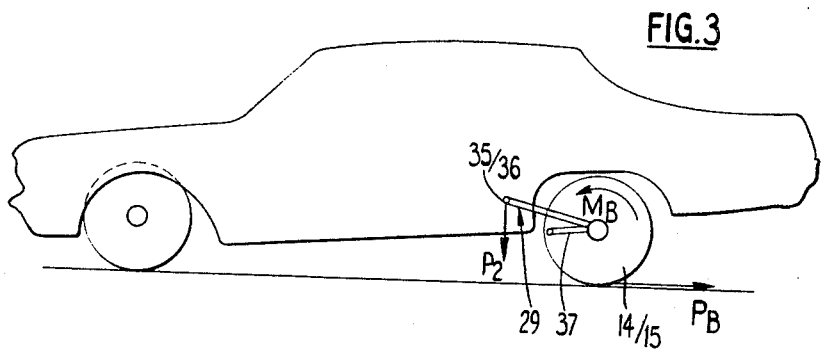
FIGURE 3 is a schematic side elevation similar to FIGURE 2 but showing the torsion bar spring arrangement in a position it assumes during braking of the vehicle.

As is indicated in FIGURE 3, during braking there is a rearwardly directed frictional force $P_B$ at each wheel contact surface which tends to turn the rear axle assembly in the direction of arrow $M_B$. The resulting downward movement of the forward extension 26 of the differential housing 11 causes corresponding downward movement of the curved portion 37 of the torsion bar spring 29, so causing a downwardly directed force $P_2$ to be transmitted through the bearing shackles 35 and 36 to the longitudinal side members of the vehicle, and giving the desirable result that the relieving of load at the rear axle assembly 10 during braking does not lead to such a severe lifting of the rear end of the vehicle as would otherwise be expected.

The curved spring portion 37, and the bearing 38 by means of which the curved spring portion is rotatably mounted on the differential housing 11 (in the described embodiment, on the forward extension 26 of the differential housing), thus provide, in a particularly simple manner, effective control of the rear end of the vehicle to combat acceleration squat and brake drive. Because the curved portion 37 is an integral part of the one-piece torsion bar spring 29, the bearing 38 can be of very simple construction, and may as illustrated comprise a simple metal bracket which is bolted or otherwise secured to the differential housing and contains an annular bushing of rubber or other elastomeric material surrounding the curved spring portion 37.

I claim:

1. A rear wheel suspension for a motor vehicle, which comprises a rigid rear axle assembly including an opposed pair of axle tubes rigidly connected to a differential housing, a pair of rear road wheels mounted for rotation at the outer ends of the axle tubes, suspension springs resiliently connecting the axle tubes to a sprung portion of the vehicle, and a one-piece torsion bar spring having longitudinally extending arm portions articulated at their free ends to the sprung portion of the vehicle, a generally transversely extending body portion rotatably connected to said axle tubes by laterally oppositely spaced bearings defining a common transverse axis and a central arch-like curve portion rotatably mounted on said differential housing at a point spaced from said common axis, the means for rotatably mounting said arch-like curve portion comprising a bracket secured to the differential housing and containing a bushing surrounding the curve portion of the spring.

2. A rear wheel suspension according to claim 1, wherein the arch-like curved portion of the one-piece torsion bar spring is rotatably mounted on a forward extension of the differential housing.

3. A rear wheel suspension according to claim 1, wherein the longitudinally extending arm portions of the one-piece torsion bar spring extend forwardly from the transversely extending body portion of the spring.

4. A rear wheel suspension according to claim 3, wherein the free ends of the longitudinally extending arm portions of the torsion bar spring are articulated to the sprung portion of the vehicle by means of bearing shackles.

5. A rear wheel suspension according to claim 4, wherein the suspension springs resiliently connecting the axle tubes to the sprung portion of the vehicle comprise semi-elliptic springs.

6. A rear wheel suspension according to claim 1, wherein the suspension springs resiliently connecting the axle tubes to the sprung portion of the vehicle comprise semi-elliptic springs.

References Cited
UNITED STATES PATENTS

| | | | |
|---|---|---|---|
| 2,345,448 | 3/1944 | Best | 180—73 |
| 2,582,775 | 1/1952 | Giacosa | 267—11 |
| 2,753,007 | 7/1956 | Read | 267—11 X |

A. HARRY LEVY, *Primary Examiner.*